US012608633B2

(12) United States Patent
Liu et al.

(10) Patent No.: US 12,608,633 B2
(45) Date of Patent: Apr. 21, 2026

(54) BAYESIAN CLASSIFICATION RECOGNITION SYSTEM BASED ON INDUSTRIAL PaaS PLATFORM

(71) Applicant: Yantai University, Yantai (CN)

(72) Inventors: Zhaowei Liu, Yantai (CN); Dong Yang, Yantai (CN); Hang Su, Yantai (CN); Yingjie Wang, Yantai (SD); Haiyang Wang, Yantai (SD); Yongchao Song, Yantai (CN)

(73) Assignee: Yantai University, Yantai (CN)

( * ) Notice: Subject to any disclaimer, the term of this patent is extended or adjusted under 35 U.S.C. 154(b) by 593 days.

(21) Appl. No.: 18/307,836

(22) Filed: Apr. 27, 2023

(65) Prior Publication Data

US 2024/0362509 A1     Oct. 31, 2024

(51) Int. Cl.
*G06N 7/01* (2023.01)
*G06N 3/08* (2023.01)

(52) U.S. Cl.
CPC ................. *G06N 7/01* (2023.01); *G06N 3/08* (2013.01)

(58) Field of Classification Search
CPC ..................................... G06N 7/01; G06N 3/08
See application file for complete search history.

(56) References Cited

FOREIGN PATENT DOCUMENTS

| | | |
|---|---|---|
| CN | 107430613 A | 12/2017 |
| CN | 110741390 A | 1/2020 |
| CN | 114444615 A | 8/2020 |

OTHER PUBLICATIONS

Zhang Y, Pal S, Coates M, Ustebay D. Bayesian graph convolutional neural networks for semi-supervised classification. InProceedings of the AAAI conference on artificial intelligence Jul. 17, 2019 (vol. 33, No. 01, pp. 5829-5836). (Year: 2019).*
Hu W, Al-Dabbagh AW, Chen T, Shah SL. Design of visualization plots of industrial alarm and event data for enhanced alarm management. Control Engineering Practice. Oct. 1, 2018;79:50-64. (Year: 2018).*

* cited by examiner

*Primary Examiner* — KC Chen

(57)          ABSTRACT

Disclosed is a Bayesian classification recognition system based on an industrial PaaS platform, comprising: an IaaS infrastructure service layer, a G-PaaS graph neural network processing layer, an O-PaaS docking service layer and an SaaS system application layer. The G-PaaS graph neural network processing layer is configured for point cloud feature generation, point cloud feature learning, point cloud structure estimation and point cloud model classification; and the recognition accuracy of a workpiece point cloud model is improved through the Bayesian classification recognition system based on the industrial PaaS platform.

6 Claims, 1 Drawing Sheet

BAYESIAN CLASSIFICATION RECOGNITION SYSTEM BASED ON INDUSTRIAL PaaS PLATFORM

TECHNICAL FIELD

The present invention relates to an application of a Bayesian probability and a graph neural network in classification of a workpiece cloud platform, and particularly to a Bayesian classification recognition system based on an industrial PaaS platform.

BACKGROUND OF THE PRESENT INVENTION

With the development of digital twin technology, a number of point cloud models is increasing day by day, and requirements for intellectualization, classification, recognition, analysis and processing capabilities of a digital twin model base configured for storing the point cloud models are getting higher. However, an existing digital twin model base realizes model category recognition manually when the point cloud models are stored, leading to low efficiency and high costs.

At present, there is a graph neural network model for processing point cloud data classification, while it is a consensus that a graph neural network depends on a good graph structure, mainly because a point cloud data structure is complex and diverse and has various information, and data in practice are not all useful information. However, the current graph neural network model for processing the point cloud data does not realize edge modeling of the point cloud data and does not consider a graph structure of the point cloud data, so that a classification capability of the graph neural network model for processing the point cloud data needs to be improved.

SUMMARY OF PRESENT INVENTION

The present invention aims to provide a Bayesian classification recognition system based on an industrial PaaS platform, which is characterized by comprising an IaaS infrastructure service layer, a G-PaaS graph neural network processing layer, an O-PaaS docking service layer and an SaaS system application layer, wherein:
the IaaS infrastructure service layer is configured for providing physical resource control service and management for a request submitted by the G-PaaS graph neural network processing layer, wherein the physical resource at least comprises a computing resource, a storage resource and a network resources;
the G-PaaS graph neural network processing layer is configured for providing background underlying computing service support to the SaaS system application layer, and at least comprises a point cloud feature generation module, a point cloud feature learning module, a point cloud structure estimation module and a point cloud model classification module; the point cloud feature generation module pre-processes a point cloud feature through a diffusion-based spatial code, generates an original feature of point cloud, and represents a structural role of each node in the point cloud from a global perspective; the point cloud feature learning module aggregates feature information of a plurality of edges connected with a central node by using an existing graph attention network model to represent feature information of the central node; the point cloud structure estimation module calculates a feature similarity of a node with surrounding nodes by using a proposed estimation method self-adaptive to Bayesian network structure learning, selects an adjacent node as a neighboring node of the node according to the feature similarity, and adds a concept of a spatial local critical region; and the point cloud model classification module completes convergence of a graph neural network model by realizing iterative optimization of the point cloud feature learning module and the point cloud structure estimation module for point cloud model classification;
the O-PaaS docking service layer is configured for providing a data docking service and an authority authorization service between the SaaS system application layer and a private cloud SaaS system and the G-PaaS graph neural network processing layer, and between a point cloud acquisition system of the O-PaaS docking service layer and the G-PaaS graph neural network processing layer; and
the SaaS system application layer is configured for being orientated to a user and connected with the O-PaaS docking service layer, and at least comprises a user input management module, a platform management module, a collaborative design module, a checking module, a document management module and a workpiece classification result display module.

Optionally, in one embodiment of the present invention, the IaaS infrastructure service layer comprises a unified resource management module, a general access authority management module and a monitoring alarm management module. The unified resource management module is configured for providing efficient physical resource allocation strategies for different types of resource requests above the IaaS layer; the general access authority management module is configured for supporting multi-user authority management of multiple user roles and levels, and docked with an authority service in the O-PaaS docking service layer to realize single sign-on of the same account; and the monitoring alarm management module is configured for uniformly monitoring various types of related resources on cloud and supporting a SaaS real-time alarm information display function.

Optionally, in one embodiment of the present invention, the O-PaaS docking service layer comprises an interface configuration module, an access authority module, a device networking management module, a device connection management module, a protocol conversion module and a point cloud acquisition system module.

Optionally, in one embodiment of the present invention, the SaaS system application layer is configured for providing a capability of supporting the industrial PaaS platform to classify workpieces.

Optionally, in one embodiment of the present invention, the point cloud feature generation module is configured for:
representing point cloud data as G={V, E, H}, wherein V is a set of N point cloud nodes, and E is a set of edges and represented by an adjacency matrix $A \in R^{N \times N}$, wherein $A_{i,j}$ represents that one edge exists between a node i and a node j; and H={$h_1$, $h_2$, . . . , $h_N$}$\in R^{N \times D}$ represents a node feature matrix, and each node $V_i \in V$ has a corresponding D-dimensional feature vector $h_i$; and preprocessing the point cloud feature through a diffusion-based spatial code, generating an original node feature H of the point cloud, and representing a structural role of each node in the point cloud from a global perspective. Specifically, for the diffusion-based spatial code, a diffusion matrix S between nodes in the point cloud set is calculated by using a graph diffusion technology; then, each node v in the point cloud set is sorted according to a diffusion value of the node, and the sort is used as a data source; and the diffusion-based spatial code is calculated by using a learnable coding function (single-layer linear mapping) according to a grade, and finally, the nodes are stacked into the original node feature H representing a point cloud attribute; and the diffusion-based spatial code is defined as follows:

$$H = \otimes [\mathrm{linear}(\mathrm{rank}(S[\mathrm{idenx}(v_i)]))]^T$$

wherein, idenx ( ) is an index query function, rank ( ) is a sorting function, and linear ( ) is a learnable linear mapping; and $\otimes$ represents series operation of matrix, and $[\ ]^T$ represents transposition of matrix.

Optionally, in one embodiment of the present invention, the point cloud structure estimation module is configured for:

representing an original undirected graph structure by $G_{obs} = (V, Y)$, wherein $Y_{ab} \in \{0, 1\}$, $1 \leq a \leq b \leq V$; when $Y_{ab}$ is equal to 1, a connected edge exists between a node a and a node b, and when $Y_{ab}$ is equal to 0, no connected edge exists; in the point cloud structure estimation method, each node a is related to polynomial distribution $\pi_a$ on a hidden community of the node a; and assuming that a total number a of communities is a K class, probability distribution of a membership degree of a community member of each node is $\pi_a = [\pi_{a1}, \pi_{a2}, \ldots, \pi_{aK}]$, and if probability distributions of membership degrees of community members of two nodes are the same, an existence probability of a connected edge between the two nodes is higher; and a joint posterior probability of the point cloud structure estimation module is defined as:

$$p(\pi, \beta \mid G_{obs}) \propto p(\beta) p(\pi) p(G_{obs} \mid \pi, \beta) =$$

$$\begin{cases} \prod_{k=1}^{K} p(\beta_k) \prod_a^{N} p(\pi_a) \prod_{1 \leq a < b \leq N} \sum_{Z_{ab}, Z_{ba}} p(Y_{ab}, Z_{ab}, Z_{ba} \mid \pi_a, \pi_b, \beta), & \text{if } Z_{ab} = Z_{ba} \\ \prod_{k=1}^{K} p(\beta_k) \prod_a^{N} p(\pi_a) \prod \prod_{1 \leq a < b \leq N} \sum_{Z_{ab}, Z_{ba}} p(Y_{ab}, Z_{ab}, Z_{ba} \mid \pi_a, \pi_b, \delta), & \text{otherwise} \end{cases},$$

wherein, $0 \leq \beta K \leq 1$ represents a strength of a $K^{th}$ community, $\delta$ represents a probability of cross-community linking, Beta distribution is used as a prior of $\beta_K$, and Dirichlet distribution is used as a prior of $\pi_a$.

Optionally, in one embodiment of the present invention, the point cloud model classification module is configured for:

incorporating the Bayesian method into the graph neural network model to estimate a neighboring node of the point cloud, and regarding an original graph structure as realization of a parametric random graph family by considering the Bayesian method; and a joint posterior coefficient, a node weight coefficient, an attention coefficient and a node label are inferred through the point cloud model classification module to calculate a posterior probability of a label, and the classification method is expressed as:

$$p(Z \mid Y_L, X, G_{obs}) =$$

$$\int p(Z \mid X, \alpha, g, W) p(W \mid Y_L, X, g) p(g \mid \lambda) p(\lambda \mid G_{obs}) dW dg d\lambda,$$

wherein, $\alpha$ represents the attention coefficient; W is modeled as a random variable, and represents a weight coefficient on a graph structure g; Y represents a label of a training set; $\lambda$ represents a parameter of the point cloud structure estimation module, Z represents a low-dimensional vector representation of a node; $Y_L$ represents a label of a training set; and $G_{obs}$ represents an original undirected graph structure; and a posterior of $p(W \mid Y_L, X, g)$ is approximately solved by a Markov Chain Monte Carlo method, and Monte Carlo is approximately:

$$P(Z \mid Y_L, X, G_{obs}) \approx$$

$$\frac{1}{KV} \sum_{k=1}^{K} \sum_{v=1}^{V} \frac{1}{N_G S} \sum_{i=1}^{N_G} \sum_{s=1}^{S} p(Z \mid \alpha_{s,i,v,k}, W_{s,i,v}, g_{i,v}, X),$$

under the approximation, V samples $\lambda_v$ are extracted from $p(\lambda \mid G_{obs})$; $N_G$ graphs $g_{i,v}$ are sampled from $p(g \mid \lambda_v)$ through the point cloud structure estimation module; S weight matrices $W_{s,i,v}$ are sampled by $p(W \mid Y, X, g_{i,v})$ from the graphs $g_{i,v}$ through the point cloud feature learning module; and for an attention coefficient $\alpha_{s,i,v,k}$, an attention coefficient $\alpha_{ij}$ of a node m and a first-order neighboring node n ($n \in N_m$) of the node m is learned by the attention coefficient calculation formula in the weight matrices $W_{s,i,v}$.

Optionally, in one embodiment of the present invention, workpiece data is input into the system by a user through the SaaS system application layer, and the O-PaaS docking service layer transmits the workpiece data to the G-PaaS graph neural network processing layer for processing.

According to the present invention, the point cloud structure estimation module is added into the G-PaaS Bayesian graph neural network processing layer, and the graph structure of the point cloud data is re-estimated through the point cloud structure estimation module, so that the uncertainty of the point cloud data is described, the connected edge of the point cloud data is modeled, and then a better graph structure is generated, thus improving a classification performance of the graph neural network, and improving an accuracy of workpiece recognition and classification by 70% compared with a traditional method in which only the graph attention network is used.

DETAILED DESCRIPTION OF PREFERRED EMBODIMENTS

Figure 1:
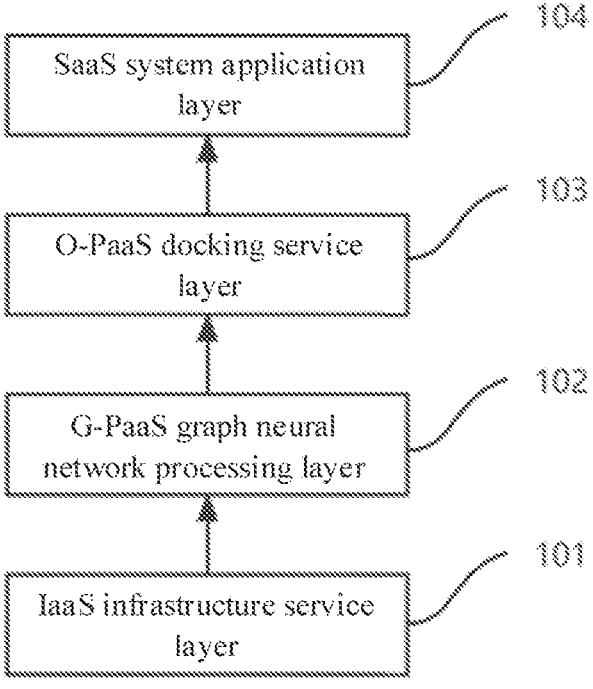
FIG. 1 is a schematic structural diagram of a system according to the present invention.
Figure 2:
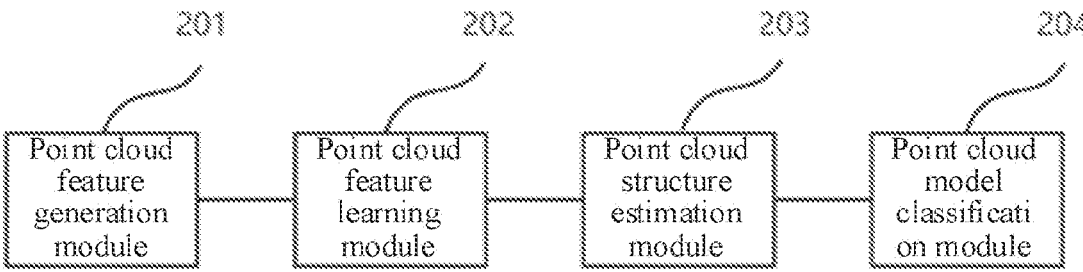
FIG. 2 a schematic diagram of processing modules in a G-PaaS Bayesian neural network processing layer according to the present invention.

In order to make the objects, technical solutions and advantages of embodiments of the present invention clearer, the technical solutions in the embodiments of the present invention are clearly and completely described hereinafter with reference to the drawings in the embodiments of the present invention. First Embodiment The embodiment provides a Bayesian classification recognition system based on an industrial PaaS platform. With reference to the schematic diagram in FIG. 1, the system is a complete IaaS-PaaS-SaaS system architecture system comprising a basic hardware facility, a workpiece classification computing service middle layer and a software application platform, wherein an upper layer is an SaaS system application layer 104, and used as a system visual presentation layer; a middle layer is used as a system business logic layer, and constructed with an O-PaaS docking service layer 103 and a G-PaaS graph neural network processing layer 102; and a bottom layer is an IaaS infrastructure service layer 101, and used as a system hardware support layer.

The SaaS system application layer 104 is configured for being orientated to a user and connected with the O-PaaS docking service layer, so as to provide a capability of supporting the industrial PaaS platform to classify workpieces; and at least comprises a user input management module, a platform management module, a collaborative design module, a checking module, a document management module and a workpiece classification result display module. The user input management module is configured for receiving data input, analysis, configuration management and other operations of an enterprise staff; the platform management module is configured for enterprise management and daily operation and maintenance of platform by a platform staff; the collaborative design module is configured for breaking through limitations of region, time and device on cooperation between enterprises; the checking module involves checking of an enterprise qualification, a workpiece classification task plan and a design task, so as to ensure qualities of platform enterprise and service; and the document management module is configured for facilitating cooperation between an enterprise and a staff thereof on the platform, and facilitating unified document issuing by the enterprise, so that the staff of the enterprise may view a document needed for work without geographical and time-space limitations.

The O-PaaS docking service layer 103 is configured for completing docking with the user input management module, the platform management module, the collaborative design module, the checking module, the document management module and the workpiece classification result display module of the SaaS system application layer, and docking of the O-PaaS docking service layer with a private cloud PaaS device; and after point cloud data of a workpiece is acquired through the point cloud acquisition system module, a data docking service with the point cloud data processing module of the G-PaaS graph neural network processing layer and an authority authorization service are completed. An interface configuration module, an access authority module, a device networking management module, a device connection management module, a protocol conversion module and a point cloud acquisition system module are established in the O-PaaS docking service layer, and various business module interfaces are established and initialized and parameters are configured at the same time. The interface configuration module at least comprises a data transmission interface, a classification result display interface, a workpiece query interface, a user login interface and a message pushing interface. The access authority module is configured for realizing authority management on a device and unified authorization on an administrator's account by the user. The device networking management module is configured for performing network management on the accessed device. The device connection management module is configured for acquiring information of the connected private cloud PaaS device, and after the private cloud PaaS device is accessed, two-way communication between the PaaS cloud platform and the private cloud PaaS device is supported, and mutual transmission of the device information is performed on the basis of communication. The protocol conversion module is configured for converting a protocol of the private cloud PaaS device into a standard protocol. The point cloud acquisition system module is configured for acquiring the point cloud data of the workpiece.

A point cloud feature generation module 201, a point cloud feature learning module 202, a point cloud structure estimation module 203 and a point cloud model classification module 204 are established in the G-PaaS graph neural network processing layer 102. The G-PaaS graph neural network processing layer is configured for providing background underlying computing service support to the SaaS system application layer. The point cloud feature generation module pre-processes a point cloud feature through a diffusion-based spatial code, generates an original feature of point cloud, and represents a structural role of each node in the point cloud from a global perspective. The point cloud feature learning module aggregates feature information of a plurality of edges connected with a central node by using a graph neural network with an attention mechanism to represent feature information of the central node. The point cloud structure estimation module calculates a feature similarity of a node with surrounding nodes by using a proposed estimation method self-adaptive to Bayesian network structure learning, selects an adjacent node as a neighboring node of the node according to the feature similarity, and adds a concept of a spatial local critical region, so as to facilitate point cloud learning of a better feature. The point cloud model classification module completes convergence of a graph neural network model by realizing iterative optimization of the point cloud feature learning module and the point cloud structure estimation module for point cloud model classification.

The IaaS infrastructure service layer 101 provides a physical resource control service and manages a physical computing resource. A fuzzy request for a certain kind of resources submitted by the G-PaaS graph neural network processing layer can be converted into a clear physical resource, wherein the physical resource at least comprises a computing resource, a storage resource and a network resource. The IaaS infrastructure service layer comprises a unified resource management module, a general access authority management module and a monitoring alarm management module, wherein the unified resource management module is configured for providing efficient physical resource allocation strategies for different types of resource requests above the IaaS layer to improve a resource utilization rate; the general access authority management module is configured for supporting multi-user authority management of multiple user roles and levels, and docked with an authority service in the O-PaaS docking service layer to perform authority authentication and realize single sign-on of the same account; and the monitoring alarm management module is configured for uniformly monitoring various types of related resources on cloud such as a physical server, a virtual machine, a network switch and a storage, and supporting a SaaS real-time alarm information display function. The main function is to provide the efficient physical resource allocation strategy to improve the resource utilization rate. Meanwhile, it is unnecessary to consider specific details of underlying hardware when the upper PaaS layer makes a request, so that resources of different types of users above the IaaS infrastructure service layer are more convenient and efficient to use.

The point cloud feature generation module is configured for: representing point cloud data as G={V, E, H}, wherein V is a set of N point cloud nodes, and E is a set of edges and represented by an adjacency matrix $A \in R^{N \times N}$, wherein $A_{i,j}$ represents that one edge exists between a node i and a node j; and H={$h_1$, $h_2$, . . . , $h_N$}$\in R^{N \times D}$ represents a node feature matrix, and each node $V_i \in V$ has a corresponding D-dimensional feature vector $h_i$; and pre-processing the point cloud feature through a diffusion-based spatial code, generating an original node feature H of the point cloud, and representing a structural role of each node in the point cloud from a global perspective; specifically, for the diffusion-based spatial code, a diffusion matrix S between nodes in the point cloud set is calculated by using a graph diffusion technology; then, each node v in the point cloud set is sorted according to a diffusion value of the node, and the sort is used as a data source; and the diffusion-based spatial code is calculated by using a learnable coding function according to a grade, and finally, the nodes are stacked into the original node feature H representing a point cloud attribute; and the diffusion-based spatial code is defined as follows:

$$H = \otimes[\text{linear}(\text{rank}(S[\text{idenx}(v_i)]))]^T$$

wherein, idenx ( ) is an index query function, rank ( ) is a sorting function, and linear ( ) is a learnable linear mapping; and $\otimes$ represents series operation of matrix, and $[\ ]^T$ represents transposition of matrix.

The point cloud feature learning module is configured for:
applying one weight matrix $W \in R^{F' \times F}$ to each node as a parametric linear transformation; and calculating an attention coefficient $\alpha_{ij}$ between nodes (i, j):

$$\alpha_{ij} = \frac{\exp\left(\text{LeakyReLU}\left(\frac{\vec{a}^T\left[W\vec{h}_i \| W\vec{h}_j\right]}{\sqrt{F}} \cdot \sigma\left(\left(W\vec{h}_i\right)^T \cdot W\vec{h}_j\right)\right)\right)}{\sum_{k \in N_i} \exp\left(\text{LeakyReLU}\left(\frac{\vec{a}^T\left[W\vec{h}_i \| W\vec{h}_j\right]}{\sqrt{F}} \cdot \sigma\left(\left(W\vec{h}_i\right)^T \cdot W\vec{h}_k\right)\right)\right)}.$$

The attention coefficient $\alpha_{ij}$ represents an importance of a feature of the node i to the neighboring node j of the node.

The attention coefficient $\alpha$ is a single-layer feedforward neural network, and parameters of the attention coefficient are learned by forward propagation of a model. T represents transposition, $\|$ represents a vector connection operation, F represents a square root of a feature dimension of the node i, $\sigma$ represents a nonlinear function, those meaningless neighboring nodes may be easily ignored after passing through a $\sigma$ function through point multiplication calculation of the node i and the node j, and meanwhile, importances of the nodes are implicitly allocated. The denominator herein is configured for normalizing a calculation result of the node j, and $k \in N_i$ represents that only a first-order neighboring node k of the node i is calculated.

By allocating different weights to different neighborhood nodes and aggregating features of the neighborhood nodes according to the weights, node representation is iteratively updated, so as to achieve a better classification result of the model.

Formally, multi-head-attention aggregation is expressed as:

$$\vec{h}_i' = \sigma\left(\frac{1}{K}\sum_{k=1}^{K}\sum_{j \in N_i} \alpha_{ij}^k W^k \vec{h}_j\right).$$

A learning process of self-attention is stabilized by a K-head attention mechanism. $\alpha_{ij}$ represents the attention coefficient between the node i and the node j, and $W^k$ represents a parameterized linear transformation matrix corresponding to a $K^{th}$ head. The graph neural network has two layers, wherein $\vec{h}_j$ and $\vec{h}_i$ are input and output feature vectors of an $i^{th}$ node respectively, and in final output, each node will have a feature of KF'. Therefore, finally, in the second layer of the network, the feature of each node is averaged first, and then, the final $\sigma$ nonlinear function is applied.

The point cloud structure estimation module is configured for: representing an original undirected graph structure by $G_{obs}=(V, Y)$, wherein $Y_{ab} \in \{0,1\}$, $1 \leq a < b \leq V$; when $Y_{ab}$ is equal to 1, a connected edge exists between a node a and a node b, and when $Y_{ab}$ is equal to 0, no connected edge exists. In the point cloud structure estimation module, each node a is related to polynomial distribution $\pi_a$ on a hidden community of the node a. Assuming that a total number a of communities is a K class, probability distribution of a membership degree of a community member of each node is $\pi_a = [\pi_{a1}, \pi_{a2}, . . . , \pi_{aK}]$, and if probability distributions of membership degrees of community members of two nodes are the same, an existence probability of a connected edge between the two nodes is higher.

A joint posterior probability of the point cloud structure estimation module is defined as:

$$p(\pi, \beta \mid G_{obs}) \propto p(\beta)p(\pi)p(G_{obs} \mid \pi, \beta) =$$

$$\begin{cases} \prod_{k=1}^{K} p(\beta_k) \prod_a^N p(\pi_a) \prod_{1 \leq a < b \leq N} \sum_{Z_{ab}, Z_{ba}} p(Y_{ab}, Z_{ab}, Z_{ba} \mid \pi_a, \pi_b, \beta), \text{ if } Z_{ab} = Z_{ba} \\ \prod_{k=1}^{K} p(\beta_k) \prod_a^N p(\pi_a) \prod \prod_{1 \leq a < b \leq N} \sum_{Z_{ab}, Z_{ba}} p(Y_{ab}, Z_{ab}, Z_{ba} \mid \pi_a, \pi_b, \delta), \text{ otherwise} \end{cases},$$

wherein, $0 \leq \beta_K \leq 1$ represents a strength of a $K^{th}$ community, $\delta$ represents a probability of cross-community linking, Beta distribution is used as a prior of $\beta_K$, and Dirichlet distribution is used as a prior of $\pi_a$.

The point cloud model classification module is configured for: incorporating the Bayesian method into the graph neural network model to estimate a neighboring node of the point cloud, and regarding an original graph structure as realization of a parametric random graph family by considering the Bayesian method. A joint posterior coefficient, a node weight coefficient, an attention coefficient and a node label are inferred through the point cloud model classification module to calculate a posterior probability of a label, and the classification method is expressed as:

$$p(Z \mid Y_L, X, G_{obs}) =$$

$$\int p(Z \mid X, \alpha, g, W) p(W \mid Y_L, X, g) p(g \mid \lambda) p(\lambda \mid G_{obs}) dW dg d\lambda,$$

wherein, $\alpha$ represents the attention coefficient; W is modeled as a random variable, and represents a weight coefficient on a graph structure g; Y represents a label of a training set; and $\lambda$ represents a parameter of the point cloud structure estimation module; and Z represents a low-dimensional vector representation of a node; $Y_L$ represents a label of a training set; and $G_{obs}$ represents an original undirected graph structure.

A posterior of $p(W|Y_L, X, g)$ is approximately solved by a Markov Chain Monte Carlo method, and Monte Carlo is approximately:

$$P(Z \mid Y_L, X, G_{obs}) \approx$$

$$\frac{1}{KV} \sum_{k=1}^{K} \sum_{v=1}^{V} \frac{1}{N_G S} \sum_{i=1}^{N_G} \sum_{s=1}^{S} p(Z \mid \alpha_{s,i,v,k} W_{s,i,v}, g_{i,v}, X).$$

Under the approximation, V samples $\lambda_v$ are extracted from $p(\lambda|G_{obs})$; $N_G$ graphs $g_{i,v}$ are sampled from $p(g|\lambda_v)$ through the point cloud structure estimation module. S weight matrices $W_{s,i,v}$ are sampled by $p(W|Y_L, X, g_{i,v})$ from the graphs $g_{i,v}$ through the point cloud feature learning module. For an attention coefficient $\alpha_{s,t,v,k}$, an attention coefficient $\alpha_{ij}$ of a node m and a first-order neighboring node n ($n \in N_m$) of the node m is learned by the attention coefficient calculation formula in the weight matrices $W_{s,i,v}$.

In the embodiment, the G-PaaS graph neural network processing layer calculates and classifies workpiece data by learning graph neural network model parameters through the point cloud feature learning module, the updated model parameters involve estimation of a new graph structure through the point cloud structure estimation module, and the new graph structure will be transferred to the point cloud feature learning module, so that better model parameters will be optimized until convergence is realized, and the converged graph neural network will be configured for classifying point cloud models.

To sum up, although the present invention has been disclosed in terms of preferred embodiments above, the embodiments are not intended to limit the present invention, and those skilled in the art can make various changes and modifications without departing from the spirit and scope of the present invention. Therefore, the scope of protection of the present invention should be determined by the appended patent application scope.

We claim:

1. A Bayesian classification recognition system based on an industrial PaaS platform, comprising a computer hardware facility, an IaaS infrastructure service layer, a G-PaaS graph neural network processing layer, an O-PaaS docking service layer and an SaaS system application layer, wherein:

the IaaS infrastructure service layer is configured for providing physical resource control service and management for a request submitted by the G-PaaS graph neural network processing layer;

the G-PaaS graph neural network processing layer is configured for providing background underlying computing service support to the SaaS system application layer, and at least comprises a point cloud feature generation module, a point cloud feature learning module, a point cloud structure estimation module and a point cloud model classification module; the point cloud feature generation module pre-processes a point cloud feature through a diffusion-based spatial code, generates an original feature of point cloud, and represents a structural role of each node in the point cloud from a global perspective; the point cloud feature learning module aggregates feature information of a plurality of edges connected with a central node by using a graph neural network with an attention mechanism to represent feature information of the central node; the point cloud structure estimation module calculates a feature similarity of a node with surrounding nodes by using an estimation method self-adaptive to Bayesian network structure learning, and selects an adjacent node as a neighboring node of the node according to the feature similarity to define a spatial local critical region; and the point cloud model classification module completes convergence of a graph neural network model by realizing iterative optimization of the point cloud feature learning module and the point cloud structure estimation module for point cloud model classification;

the O-PaaS docking service layer is configured for providing a data docking service and an authority authorization service between the SaaS system application layer and a private cloud SaaS system and the G-PaaS graph neural network processing layer, and between a point cloud acquisition system of the O-PaaS docking service layer and the G-PaaS graph neural network processing layer; and the SaaS system application layer is configured for being orientated to a user and connected with the O-PaaS docking service layer, and at least comprises a user input management module, a platform management module, a collaborative design module, a checking module, a document management module and a workpiece classification result display module.

2. The Bayesian classification recognition system based on the industrial PaaS platform according to claim 1, wherein:

the IaaS infrastructure service layer comprises a unified resource management module, a general access authority management module and a monitoring alarm management module;

the O-PaaS docking service layer comprises an interface configuration module, an access authority module, a device networking management module, a device connection management module, a protocol conversion module and a point cloud acquisition system module; and the SaaS system application layer is configured for providing a capability of supporting the industrial PaaS platform to classify workpieces.

3. The Bayesian classification recognition system based on the industrial PaaS platform according to claim 1, wherein:

the point cloud feature generation module is configured for:

representing point cloud data as G={V, E, H}, wherein V is a set of N point cloud nodes, and E is a set of edges and represented by an adjacency matrix $A \in R^{N \times N}$, wherein $A_{i,j}$ represents that one edge exists between a node i and a node j; and H={$h_1$, $h_2$, . . . , $h_N$}$\in R^{N \times D}$ represents a node feature matrix, and each node $V_i \in V$ has a corresponding D-dimensional feature vector $h_i$; and preprocessing the point cloud feature through a diffusion-based spatial code, generating an original node feature H of the point cloud, and representing a structural role of each node in the point cloud from a global perspective; for the diffusion-based spatial code, a diffusion matrix S between nodes in the point cloud set is calculated by using a graph diffusion technology; then, each node v in the point cloud set is sorted according to a diffusion value of the node, and the sort is used as a data source; and the diffusion-based spatial code is calculated by using a learnable coding function according to a grade, and finally, the nodes are stacked into the original node feature H representing a point cloud attribute; and the diffusion-based spatial code is defined as follows:

$$H = \otimes [\text{linear}(\text{rank}(S[\text{idenx}(v_i)]))]^T$$

wherein, idenx ( ) is an index query function, rank ( ) is a sorting function, linear ( ) is a learnable linear mapping, $\otimes$ represents series operation of matrix, and $[\ ]^T$ represents transposition of matrix.

4. The Bayesian classification recognition system based on the industrial PaaS platform according to claim 1, wherein:

the point cloud structure estimation module is configured for:

representing an original undirected graph structure by $G_{obs}$=(V, Y), wherein $Y_{ab} \in \{0,1\}$, $1 \le a \le b \le V$; when $Y_{ab}$ is equal to 1, a connected edge exists between a node a and a node b, and when $Y_{ab}$ is equal to 0, no connected edge exists; each node a is related to polynomial distribution $\pi_a$ on a hidden community of the node a; and assuming that a total number a of communities is a K class, probability distribution of a membership degree of a community member of each node is $\pi_a$=[$\pi_{a1}$, $\pi_{a2}$, . . . , $\pi_{aK}$]; and a joint posterior probability of the point cloud structure estimation module is defined as:

wherein, $0 \le \beta_K \le 1$ represents a strength of a $K^{th}$ community, $\delta$ represents a probability of cross-community linking, Beta distribution is used as a prior of $\beta_K$, and Dirichlet distribution is used as a prior of $\pi_a$.

5. The Bayesian classification recognition system based on the industrial PaaS platform according to claim 1, wherein:

the point cloud model classification module is configured for:

incorporating the Bayesian method into the graph neural network model to estimate a neighboring node of the point cloud, and regarding an original graph structure as realization of a parametric random graph family by considering the Bayesian method; and a joint posterior coefficient, a node weight coefficient, an attention coefficient and a node label are inferred through the point cloud model classification module to calculate a posterior probability of a label, which is expressed as:

$$p(Z \mid Y_L, X, G_{obs}) =$$

$$\int p(Z \mid X, \alpha, g, W) p(W \mid Y_L, X, g) p(g \mid \lambda) p(\lambda \mid G_{obs}) dW dg d\lambda,$$

wherein, $\alpha$ represents the attention coefficient; W is modeled as a random variable, and represents a weight coefficient on a graph structure g; Y represents a label of a training set; $\lambda$ represents a parameter of the point cloud structure estimation module, Z represents a low-dimensional vector representation of a node; $Y_L$ represents a label of a training set; and $G_{obs}$ represents an original undirected graph structure; and a posterior of $p(W \mid Y_L, X, g)$ is approximately solved by a Markov Chain Monte Carlo method, and Monte Carlo is approximately:

$$P(Z \mid Y_L, X, G_{obs}) \approx$$

$$\frac{1}{KV} \sum_{k=1}^{K} \sum_{v=1}^{V} \frac{1}{N_G S} \sum_{i=1}^{N_G} \sum_{s=1}^{S} p(Z \mid \alpha_{s,i,v,k} W_{s,i,v}, g_{i,v}, X),$$

under the approximation, V samples $\lambda_v$ are extracted from $p(\lambda \mid G_{obs})$; $N_G$ graphs $g_{i,v}$ are sampled from $p(g \mid \lambda_v)$ through the point cloud structure estimation module; S weight matrices $W_{s,i,v}$ are sampled by $p(W \mid Y_L, X, g_{i,v})$ from the graphs $g_{i,v}$ through the point cloud feature learning module; and for an attention coefficient $\alpha_{s,i,v,k}$, an attention coefficient $\alpha_{ij}$ of a node m and a first-order neighboring node n (n$\in N_m$) of the node m is learned by the attention coefficient calculation formula in the weight matrices $W_{s,i,v}$.

6. The Bayesian classification recognition system based on the industrial PaaS platform according to claim 2, wherein:

$$p(\pi, \beta \mid G_{obs}) \propto p(\beta)p(\pi)p(G_{obs} \mid \pi, \beta) =$$

$$\begin{cases} \prod_{k=1}^{K} p(\beta_k) \prod_a^N p(\pi_a) \prod_{1 \le a < b \le N} \sum_{Z_{ab}, Z_{ba}} p(Y_{ab}, Z_{ab}, Z_{ba} \mid \pi_a, \pi_b, \beta), \text{ if } Z_{ab} = Z_{ba} \\ \prod_{k=1}^{K} p(\beta_k) \prod_a^N p(\pi_a) \prod \prod_{1 \le a < b \le N} \sum_{Z_{ab}, Z_{ba}} p(Y_{ab}, Z_{ab}, Z_{ba} \mid \pi_a, \pi_b, \delta), \text{ otherwise} \end{cases},$$

workpiece data is input into the system by a user through the SaaS system application layer, and the O-PaaS docking service layer transmits the workpiece data to the G-PaaS graph neural network processing layer for processing.

* * * * *